United States Patent
Mukherjee et al.

(10) Patent No.: US 9,992,819 B2
(45) Date of Patent: Jun. 5, 2018

(54) METHOD AND SYSTEM FOR HYBRID AUTOMATIC REPEAT REQUEST USING MULTIPLE RECEIVER-COORDINATED TRANSMITTERS

(71) Applicant: Research In Motion Limited, Waterloo (CA)

(72) Inventors: Biswaroop Mukherjee, Stittsville, CA (US); Robert Novak, Stittsville, CA (US); William Anthony Gage, Stittsville, CA (US)

(73) Assignee: BlackBerry Limited, Waterloo, CA (US)

( * ) Notice: Subject to any disclaimer, the term of this patent is extended or adjusted under 35 U.S.C. 154(b) by 320 days.

(21) Appl. No.: 13/914,143

(22) Filed: Jun. 10, 2013

(65) Prior Publication Data

US 2013/0272291 A1    Oct. 17, 2013

Related U.S. Application Data

(63) Continuation of application No. PCT/CA2011/000575, filed on May 20, 2011.

(51) Int. Cl.
*H04W 84/02* (2009.01)
*H04L 1/00* (2006.01)
(Continued)

(52) U.S. Cl.
CPC .......... *H04W 84/02* (2013.01); *H04L 1/0009* (2013.01); *H04L 1/0068* (2013.01);
(Continued)

(58) Field of Classification Search
None
See application file for complete search history.

(56) References Cited

U.S. PATENT DOCUMENTS

| 8,004,992 B2 * | 8/2011 | Abraham et al. ............. 370/236 |
| 2003/0063583 A1 * | 4/2003 | Padovani ............ H04B 1/7103 370/329 |

(Continued)

FOREIGN PATENT DOCUMENTS

| EP | 1545040 | 6/2005 |
| EP | 1583270 | 10/2005 |

(Continued)

OTHER PUBLICATIONS

International Search Report on International Application No. PCT/CA2011/000575, dated Jan. 23, 2012.
(Continued)

*Primary Examiner* — Chirag Shah
*Assistant Examiner* — Amar Persaud
(74) *Attorney, Agent, or Firm* — Moffat & Co.

(57) ABSTRACT

A method and a receiving device, the method receiving an indication of pending data from an access network, the pending data including a sequence number for every unit of the pending data; and sending transmission instructions to a first transmitter within the access network, the transmission instructions including a range of sequence numbers desired by the receiving device and an error correction and coding scheme to be used by the first transmitter. Further, a receiving device having a processor; and a communications subsystem, wherein the processor and communications subsystem cooperate to receive a first stream from a first transmitter; receive a second stream from a second transmitter; and soft combine the first stream and the second stream at the receiving device.

12 Claims, 13 Drawing Sheets

(51) Int. Cl.
  *H04L 1/16* (2006.01)
  *H04L 1/18* (2006.01)
(52) U.S. Cl.
  CPC .......... *H04L 1/0071* (2013.01); *H04L 1/1642* (2013.01); *H04L 1/1819* (2013.01); *H04L 1/1825* (2013.01); *H04L 1/1845* (2013.01); *H04L 1/1864* (2013.01)

(56) References Cited

U.S. PATENT DOCUMENTS

| | | | |
|---|---|---|---|
| 2003/0072292 A1* | 4/2003 | Yoon | H04B 7/264 370/342 |
| 2003/0081576 A1* | 5/2003 | Kim | H04L 1/0003 370/335 |
| 2003/0210669 A1 | 11/2003 | Vayanos et al. | |
| 2004/0179506 A1 | 9/2004 | Padovani et al. | |
| 2004/0181569 A1 | 9/2004 | Attar et al. | |
| 2005/0034051 A1* | 2/2005 | Chun | H03M 13/35 714/795 |
| 2005/0085279 A1* | 4/2005 | Aoki | H04W 52/0216 370/311 |
| 2006/0193351 A1* | 8/2006 | Kim | H04B 7/2656 370/538 |
| 2006/0280160 A1* | 12/2006 | Padovani et al. | 370/347 |
| 2008/0043743 A1* | 2/2008 | Nagana | H04L 47/10 370/394 |
| 2008/0133995 A1* | 6/2008 | Lohr et al. | 714/748 |
| 2009/0175374 A1* | 7/2009 | Seki | H04B 7/02 375/260 |
| 2009/0219851 A1 | 9/2009 | Abraham et al. | |
| 2010/0128645 A1* | 5/2010 | Lin | H04W 52/0251 370/311 |
| 2010/0146352 A1* | 6/2010 | Suneya | 714/748 |
| 2011/0199975 A1* | 8/2011 | Wu | H04L 1/1812 370/328 |
| 2011/0212742 A1* | 9/2011 | Chen | H04W 76/048 455/507 |
| 2012/0014335 A1* | 1/2012 | Adachi | H04W 48/08 370/329 |
| 2014/0321348 A1* | 10/2014 | Wentink | H04W 68/02 370/311 |

FOREIGN PATENT DOCUMENTS

| | | |
|---|---|---|
| EP | 1677442 | 7/2006 |
| EP | 1777867 | 4/2007 |
| EP | 1936854 | 6/2008 |
| WO | 2006083121 | 8/2006 |

OTHER PUBLICATIONS

3GPP TS 36.321, "Evolved Universal Terrestrial Radio Access (E-UTRA); Medium Access Control (MAC) Protocol Specification", V9.3.0, Jul. 2010.

3GPP TS 36.212, "Evolved Universal Terrestrial Radio Access (E-UTRA); Multiplexing and Channel Coding", V9.3.0., Oct. 2010.

3GPP TR 36.814, "Evolved Universal Terrestrial Radio Access (E-UTRA); Further Advancements for E-UTRA Physical Layer Aspects", V.9.0.0., Mar. 2010.

3GPP TS 36.323, "Evolved Universal Terrestrial Radio Access (E-UTRA); Packet Data Convergence Protocol (PDCP) Specification", V9.0.0., Dec. 2010.

3GPP TS 36.304, "Evolved Universal Terrestrial Radio Access (E-UTRA); User Equipment (MS) Procedures in Idle Mode", V9.4.0., Oct. 2010.

Arnab Das, Farooq Khan, Ashwin Sampath and Hsuan-Jung Su, "Adaptive, Asynchronous Incremental Redundancy (A2R) with Fixed Transmission Time Intervals (TTI) for HSDPA", in Proceedings of PIMRC 2002, Lisbon, Portugal, Sep. 2002.

IEEE 802.16m-08-004r5, "IEEE 802.16m Evaluation Methodology Document"., Jan. 15, 2000.

IEEE Standard for Local and Metropolitan Area Networks, "802.16-2009 Part 16: Air Interface for Broadband Wireless Access Systems", May 2009.

European Patent Office, Extended European Search Report, App No. 11866165.1, Apr. 4 2015.

3rd Generation Partnership Project, NTT Docomo et al, Feedback Control for MBMS in E-Ultra, 3GPP Draft R1-073704 MBMS With Feedback, Paragraphs 1 and 2, Retrieved on Aug. 15, 2007, Mobile Competence Centre; 650 Route Des Lucioles, F-06921 Sophia-Antipolis Cedex; France, vol. RAN WG1, no. Athens, Greece, XP050596479.

European Patent Office, Office Action for Application No. 11866165, dated Nov. 9, 2016.

\* cited by examiner

METHOD AND SYSTEM FOR HYBRID AUTOMATIC REPEAT REQUEST USING MULTIPLE RECEIVER-COORDINATED TRANSMITTERS

CROSS-REFERENCE TO RELATED APPLICATIONS

The present application is a bypass continuation of PCT/CA2011/000575, filed May 20, 2011, the entire contents of which are incorporated herein by reference.

FIELD OF THE DISCLOSURE

The present disclosure relates to a mobile device and in particular to a mobile device communicating with a plurality of access points.

BACKGROUND

Hybrid automatic repeat request (HARQ) is a combination of forward error correcting coding and error detection utilizing an automatic repeat request error coding method. In general, a transmitter will send data to a receiver, and if the receiver can successfully decode the data then the receiver will send an acknowledgement (ACK) to the transmitter. Conversely, if the receiver cannot decode the data properly, the receiver will send a negative acknowledgement (NACK) to the transmitter.

Present retransmission mechanisms using HARQ techniques work by having an access point sending and resending one or more coded data blocks to the mobile device, which soft combines the transmissions to reconstruct the original data block. However, with increasing demand for higher data rates in many locations, it is expected that an increased number and variety of wireless access points that support higher data rates, but shorter range, will be deployed. As used in the present disclosure, an access point can be any point from which a mobile device can receive data, including, but not limited to, a cellular connection, a WiFi™ connection, a short-range connection among others.

The deployment of a high density of access points will result in an environment of dense and variable coverage of wireless access for mobile devices. While present retransmission mechanisms using HARQ may be suitable for environments where the mobile device can receive good quality signals from a single access point, such mechanisms may be poorly suited to dense, variable wireless coverage environments with overlapping coverage from multiple access points.

BRIEF DESCRIPTION OF THE DRAWINGS

The present disclosure will be better understood with reference to the drawings, in which:

FIG. 4 is a process diagram showing the retrieval of data by a mobile device from a network the device is registered with;

DETAILED DESCRIPTION OF THE DRAWINGS

Figure 1:
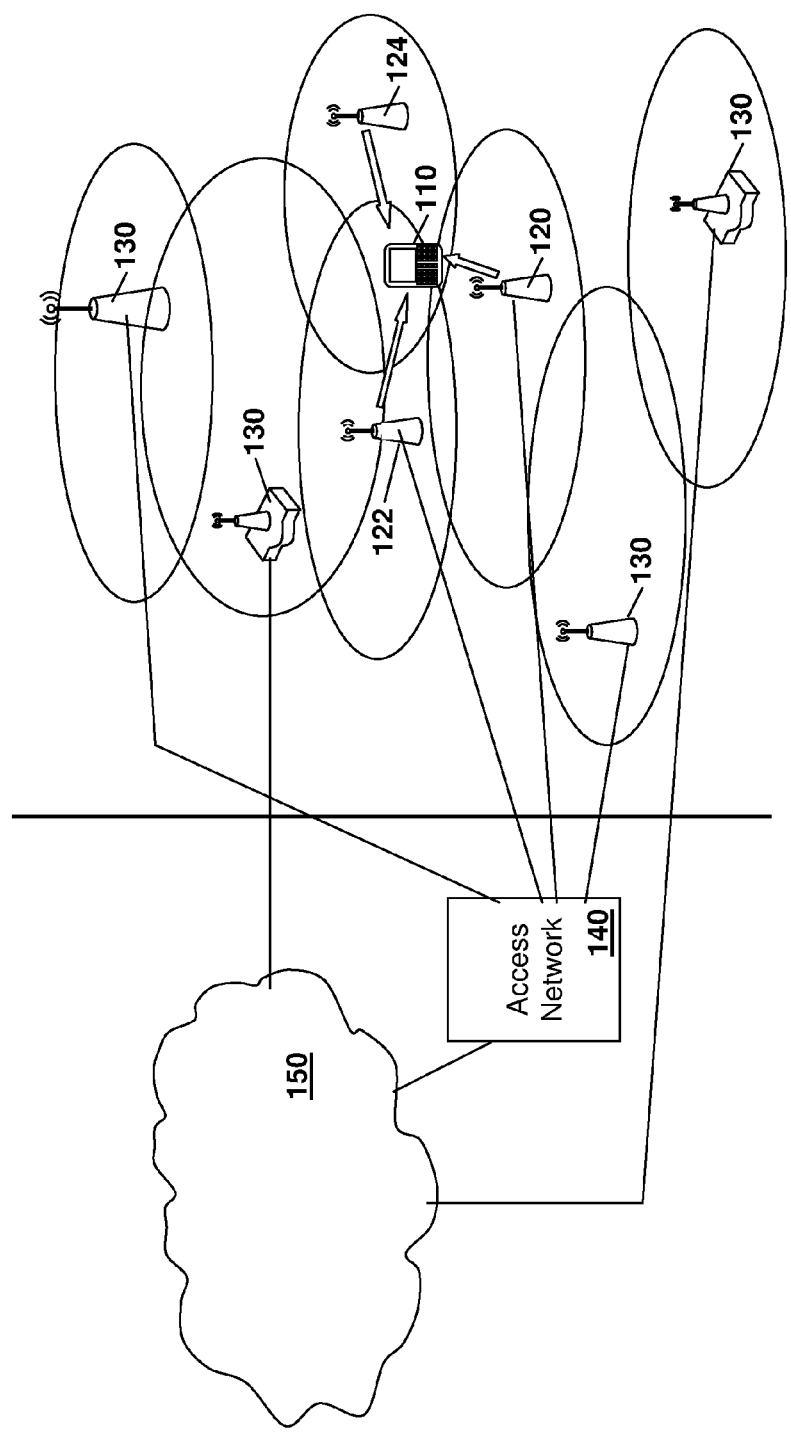
FIG. 1 is an architectural diagram of an exemplary network having a plurality of access points.

The present disclosure provides a method at a receiving device, comprising: receiving an indication of pending data from an access network, the pending data including a sequence number for every unit of the pending data; and sending transmission instructions to a first transmitter within the access network, the transmission instructions including a range of sequence numbers desired by the receiving device and an error correction and coding scheme to be used by the first transmitter.

The present disclosure further provides a receiving device comprising: a processor; and a communications subsystem, wherein the processor and communications subsystem cooperate to receive an indication of pending data from an access network, the pending data including a sequence number for every unit of the pending data; and send transmission instructions to a first transmitter within the access network, the transmission instructions including a range of sequence numbers desired by the receiving device and an error correction and coding scheme to be used by the first transmitter.

The present disclosure further provides a method at a receiving device comprising: receiving a first stream from a first transmitter; receiving a second stream from a second transmitter; and soft combining the first stream and the second stream at the receiving device.

The present disclosure still further provides a receiving device comprising: a processor; and a communications subsystem, wherein the processor and communications subsystem cooperate to receive a first stream from a first transmitter; receive a second stream from a second transmitter; and soft combine the first stream and the second stream at the receiving device.

In the present disclosure, systems and methods are provided to configure, request, receive and combine data transmission from multiple transmitters. In general, the present disclosure relates to the configuration, requesting, receiving and combining of data transmissions at a receiver from any set of transmitters. Such set of transmitters may include but is not limited to transmitters having the same radio access technology (RAT), transmitters using different RATs, multiple carriers within the same RAT from one or more transmitters, among others.

While the present disclosure is provided with regard to downlink HARQ, where a single mobile device configures, requests, receives and combines data transmission at a receiver from several access points, the present disclosure is not meant to be limited to downlink HARQ. The systems and methods described herein could equally be applicable to uplink HARQ where multiple mobile devices transmit to a single access point as a receiver. Further, distributed peer-to-peer HARQ would also be applicable with regard to the present systems and methods.

The term "mobile device", as used herein, could be any wireless device, including, but not limited to a mobile station, user equipment (UE), personal digital assistant, data enabled cellular telephone, pager, laptop, among others, and could further include a relay such as those in the Third Generation Partnership Project (3GPP) or WiMAX, a mobile subscriber station (MSS), a fixed subscriber station (FSS), among others.

The term access point (AP), as used herein, indicates a wireless service point and may include a node B, evolved node B (eNB), home evolved node B (HeNB), a relay in 3GPP, a base station or relay in WiMAX, an access point in 802.11 or any such similar wireless service point. The present disclosure is not limited to any particular type of access point.

Reference is now made to FIG. 1, which shows an exemplary system model in which a mobile device 110 communicates with a plurality of access points. In the example of FIG. 1, mobile device 110 is capable of communicating with access points 120, 122 and 124.

Further access points 130 provide communication in separate areas for which the mobile device is currently not capable of communicating.

Each access point 120, 122, 124 and 130 may interact with an access network 140, either directly or through an wide area network such as the Internet 150.

As a mobile device 110 moves between cells, access points 120, 122, 124 and 130 may provide better or worse signal quality for mobile device 110, and thus the access point serving mobile device 110 may change. Further, signal quality may change based on other mobile devices within a cell, interference from other sources, among other factors.

As will be appreciated, the system model of FIG. 1 is simplified. In some cases, a plurality of access networks 140 will exist and the mobile device 110 may need to register with each of the plurality of access networks 140 in order to get data. The access points 120, 122, 124 and 130 will interact with one or multiple access networks.

Further, the model of FIG. 1 does not show the content providers, such as web servers, enterprise servers or others, that may provide data through an access network 140.

Based on the system model of FIG. 1, the present disclosure provides for, in one embodiment, the selection of an access point from which mobile device 110 can receive at least a portion of the data waiting for the mobile device.

Data Transfer

The present disclosure provides for the initiation of contact with an access network, and communication of data from the access network via an access point to the mobile device.

Registration

Initially the mobile device is not registered anywhere and there is no data waiting for the mobile device to receive. At this point, the mobile device is in not registered to any access network.

Figure 2:
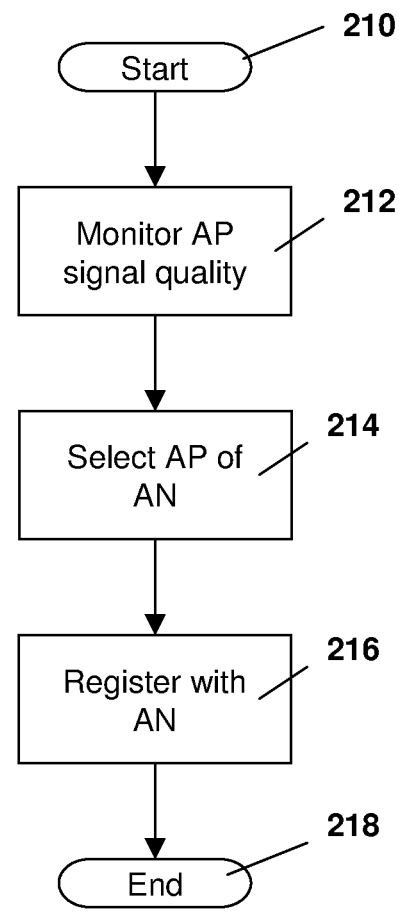
FIG. 2 is a process diagram showing the registration of a mobile device with an access network.

Reference is now made to FIG. 2, which shows an exemplary process diagram for the registration of such an unregistered mobile device.

In the process of FIG. 2, the process starts at block 210 and proceeds to block 212 in which the unregistered mobile device monitors access point signal quality for access points (AP) that the mobile device can see.

Based on the monitoring at block 212, the process proceeds to block 214 in which the mobile device selects at least one access point for the access network (AN) based on the signal quality.

From block 214, the process proceeds to block 216 in which the mobile device registers with at least one access network in order to transmit data to the network and to receive an indication when there is data to be received from the network. As part of the registration, the mobile device may specify at least two items. A first item that the mobile device may specify is the duration of the "receive time" when the mobile device will be available to receive an indication from the access points of the access network. The indication indicates if there is any data waiting in the access network to be sent to the mobile device.

The first item the mobile device may specify may also include the periodicity of the receive time. As will be appreciated by those in the art having regard to the present disclosure, this will tell the access network when to send indications to the mobile device.

A second item that the mobile device may specify to the access network is an error correction and encoding scheme that is to be used when data is sent to the mobile device. The ability to select an error correction and coding scheme allows for the combining of data from diverse access points, as provided below.

The actual modulation scheme is decided by the access point dynamically based on feedback from the mobile device for each transmission or retransmission.

Further, a third item that may optionally be sent is the sequence number of the next data item the mobile device is waiting for, as provided for below.

Thus, the signaling used for receiving data from an access point, including registration, involves various messages being sent from the mobile device through the access points.

In one embodiment, block 216 may provide for a negotiation between the access network and the mobile device. In other words, the mobile device and access network may negotiate parameters during registration to achieve agreement or to abandon registration if the two are incompatible.

The negotiation may also provide for a specific random access procedure to align the mobile device's uplink timing before the registration message is sent. Access network specific signaling may also form part of the interaction.

In order for the mobile device to be able to effectively receive transmissions from access points of multiple access networks that potentially use different RATs, the mobile device has to determine the capabilities of the access point, and where necessary, to negotiate several parameters when it registers. In an environment with a diversity of access networks, the mobile device may attempt registration with several access networks and pick the access networks that provide the configuration capabilities that allow it receive transmissions most efficiently. In some embodiments the messages exchanged during the registration may be as follows.

In some embodiments, as part of registration, the mobile device signals the error correction encoding scheme that would allow it receive and combine transmissions from various access networks or access points during the time it is actively transferring data to and from the access network or access point. The types of encoder, code block fragment size, number of parity bits and puncturing scheme are examples of the parameters that may be negotiated by the mobile device.

If the mobile device is able to select compatible access networks or to configure the error correction and coding of the access network to be compatible, it may use a combining mechanism as is described below to perform efficient combining of transmissions from several access points.

In some cases when only partial compatibility of the forward error correction encoding parameters in the access networks is possible, the mobile device is still able to combine transmissions from different access points using mechanisms described below.

In some embodiments, as part of the registration, the mobile device negotiates a receive time to receive an indication from the access network indicating availability of data. The parameters for the receive time are negotiated by the mobile device to allow it to potentially monitor several access networks. The negotiation allows for non-overlapping receive times or allows for negotiated overlapping rendezvous times using orthogonal code or frequency resources.

Further, in some embodiments, the negotiations discussed above are conducted utilizing an access network protocol specific registration message for better signaling efficiency.

The embodiments of the present disclosure therefore, in some cases, allow for the selection of forward error correction encoding schemes, rendezvous time and periodicity among other factors.

After registration is successful the process proceeds to block 218 and ends.

A mobile device may chose to register with more than one access network due to heterogeneous coverage or cost of access. Further it may chose to register with only a few access networks in order to minimize the number of downlink receive times that the mobile device needs to monitor in order to save battery life on the mobile device. In one embodiment, the mobile device may chose the receive time in different access networks it registers with to be non-overlapping in order to avoid collisions.

Once the mobile device is registered to a network, it typically chooses short reception periods to receive waiting data indications and to occasionally monitor access networks. These short wake up periods are interspersed with long periods where the mobile device does not perform any reception to conserve battery power.

Access Network Signaling Data

Figure 3:
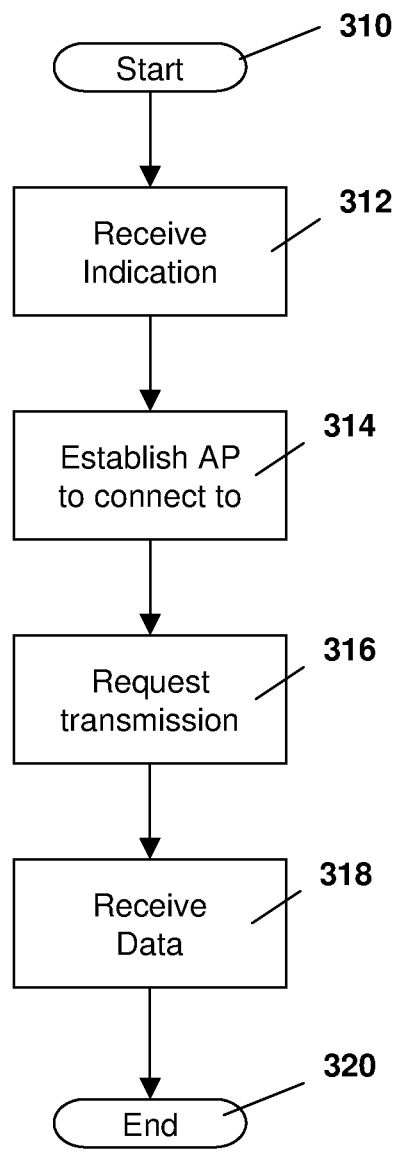
FIG. 3 is a process diagram showing the retrieval of data by a mobile device.

Reference is now made to FIG. 3. When data for mobile device is available at an access network where the mobile device is registered, the access network will send an indication to the mobile device at the designated receive time. Such receive time is the time that was established during registration of the mobile device with the access network.

The indication sent from the access network to the mobile device may contain a range of sequence numbers associated with the data that is available for the mobile device at the access network. Conversely, the indication may simply provide information to the mobile device that data is waiting. The range of data waiting may then be provided by the access point to the mobile device in a subsequent exchange prior to the mobile device receiving data.

Thus, referring to FIG. 3, the process starts at block 310 and proceeds to block 312 in which an indication is received from one or more access points in the registered access networks.

The process then proceeds to block 314 in which the mobile device estimates the best access point to connect to. This is done by attempting to estimate the quality of the radio link to the access points in the access network having data available, in order to determine the best access point to connect to.

The process then proceeds to block 316. Once the mobile device has determined the best access point to connect to, the mobile device proceeds to request downlink transmission resources from the selected access point. The resource request procedure, which may use random access techniques, may also allow the mobile device to synchronize its uplink timing with the access point so that it can, if necessary, provide feedback to the access point. This feedback may be used, for example, to update the estimated downlink channel condition to allow efficient modulation coding, as well as to request and coordinate retransmissions.

The process then proceeds to block 318 in which data is received. The mobile device receives data, reference symbols, or both from the selected access point using the allocated downlink radio resources. When the mobile device is not receiving downlink data from a particular access point, it may be receiving data from another access points, or monitoring other access points to find better radio conditions.

Using the mechanisms above, when advantageous, the mobile device actively receives data from or sends data to an access point for an interval of time. Subsequently, when it is more advantageous to do so, the mobile device suspends reception of the data transfer from the access point but is expected to return to actively transferring data in the near future to continue the reception of data.

From block 318, once the data transfer is completed the process proceeds to block 320 and ends.

In one embodiment, if there are multiple receiver structures available in the mobile device, the mobile device may be actively receiving data from more than one access point simultaneously. When the link conditions change, the mobile device may suspend reception from some access points and initiate receptions from some other access points from the same access network.

The mobile device may also be registered with other access networks and initiate reception from their access points or deregister completely from an access network to cease all communications with access points of that access network.

Figure 4:
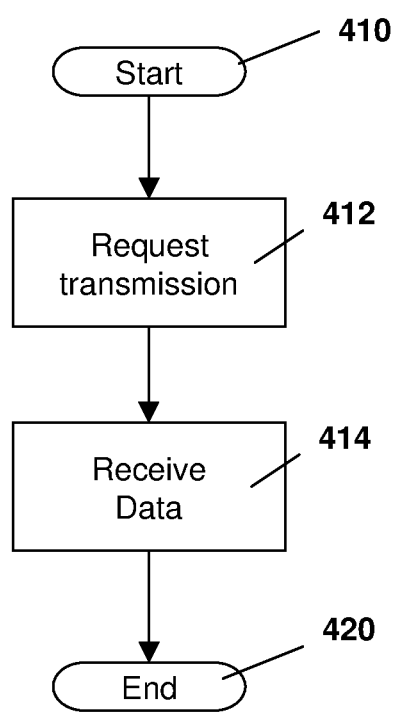

Reference is now made to FIG. 4. In some cases, an indication or data may be received from a first access point but the mobile device may choose a second access point to request some or all of the downlink transmission. Thus, the process of FIG. 4 starts at block 410 and proceeds to block 412 in which a request for downlink transmission is sent to an access point. The process then proceeds to block 414 in which data is received and the process then ends at block 420.

Thus, when considering the embodiment of FIG. 4, when a mobile device resumes actively receiving data from an access point, it requests new data to be sent to it. The message used to send the request data may be called a "transmission request". The transmission request may contain updates to the next sequence number of the next set of sequence numbers that the mobile device is waiting for. This allows the access point to discard data that is no longer required by the mobile device from that access point.

Thus, in one embodiment, every unit of data such as a byte or a packet of the stream of packets to be sent to the mobile device is conceptually assigned a unique monotonically increasing sequence number. The mechanism for synchronizing sequence numbers between a mobile device and an access network would be apparent to those in the art having regard to the present disclosure.

During a registration with a new access point, the mobile device signals the sequence numbers of the first data units that it wants to receive from that access point, called a requested sequence. When the requested data units are available at the access point, the access point provides a sequence number range of the available data units to the mobile device in a message, called the available sequence.

When a mobile device requests to receive data from the access point, it needs a way to specify, to each individual access point, which sequence of bytes or symbols, as well as which segment of the coded bits (CS), derived from the byte sequence, it wants to receive. When the mobile device is connected to just one access point, existing HARQ mechanisms may be used. However, when the mobile device is receiving transmissions from multiple access points, the mobile device needs to, in one embodiment, explicitly specify two things about the transmission it wants to receive.

The first thing that the mobile device specifies to the access point is the packet byte sequence numbers. Thus, if the mobile device wishes to receive bytes 10-19, for example, this is specified in the transmission request.

A second thing specified in the transmission request is which segment of the coded bits derived from that byte sequence the access point should send in order for the mobile device to soft combine the transmissions of systematic and parity bits from different access points.

When actively receiving data the mobile device sends a transmission request to an access point, indicating the sequence number of the next set of bytes it wants to receive. The sequence numbers allow for the mobile device to resume active reception of data after an interval of no communication with a particular access point, where the mobile device may have finished receiving some of the data from another access point. If there was a previously unsuccessfully decoded data block that the mobile device wants to continue to decode via soft combining, it includes a request for a specific segment of coded bits (CS) within the buffer of encoded bits, derived from the specified byte sequence in the transmission request message.

As will be appreciated by those in the art having regard to the present disclosure, the error coding and channel encoding scheme have already been negotiated during the registration process or indicated in the channel control of the downlink of the access point according to a possible set of configurations. In other embodiments the error coding and channel encoding scheme may be otherwise configured. This allows mapping of the systematic and parity bits of received transmissions that may be received from all access points.

During the receipt of data, if the mobile device chooses, it can send a transmission request message to another access point to request to send the same data. It can also request that the coded bits be sent from the same or different part of the buffer of coded bits. As such, the transmission request message optionally specifies how many data block bits to encode and from what offset in the buffer of coded bits it wants to receive. The mobile device uses the received coded bits to reconstruct the bits of the data block. This may, for example, be done through soft combining.

Depending on the success of decoding or based on application preferences the mobile device may request new data block bits from the access points or request retransmission of parts of the coded bit buffers, or both.

The mobile device continues to request and receive data from an access point until it sends a "transmit pause" message, indicating that the mobile device will temporarily suspend active data transfer with that access point and will not receive data or provide feedback to that particular access point until further notice.

In the transmit pause message, the mobile device may specify a duration after which it wishes to resume active data transfer with the access point. If the mobile device does not return, the access point may consider that the mobile device is no longer within range and it may in some cases deregister the mobile device.

Using the transmit pause message, the mobile device dynamically sets up the time when it is ready to receive data from a particular access point in a manner that allows it to flexibly receive data from the access point that provides the best link, while maintaining uplink timing across the access points that it is communicating with. The mobile device will continue to be able to monitor other access points.

Typically the mobile device will be actively transferring data from one access point for most of the time while suspending data transfer with other access points and only occasionally providing feedback to those access points. The access point with which the mobile device spends most of the time actively transferring data may change as the link conditions change.

The mobile device continues the reception in this manner until the time when there is no more data waiting to be received by the mobile device. It can then wait for a new indication of waiting data.

After registration with an access network and during the access point selection procedure, the mobile device chooses the access points that it will use to receive downlink data. This may require that the mobile device signal the mobility management entity of the access networks, or external to the access networks, to signal to the source of the data to ensure that the required data is delivered to the selected access points.

Based on the above, the mobile device provides feedback in the form of transmission request messages. In addition to channel state information, the mobile device's primary feedback is an indication of the set of encoded data bits that it wants in the next transmission from a selected access point. The mobile device may choose to specifically request each transmission and retransmission from the access point or it may utilize implicit retransmissions when only one access point is used, using a similar scheme to that of synchronous HARQ.

In general, data that has been buffered by the access point but has not been transmitted, acknowledged or both by the mobile device may be timed out and overwritten with new data arriving for the same or for a different mobile device.

In cases where the storage in the access point needs optimization the mobile device may feedback the data items it has received or provide an indication that it does not need any more data from the particular access point.

Figure 5:
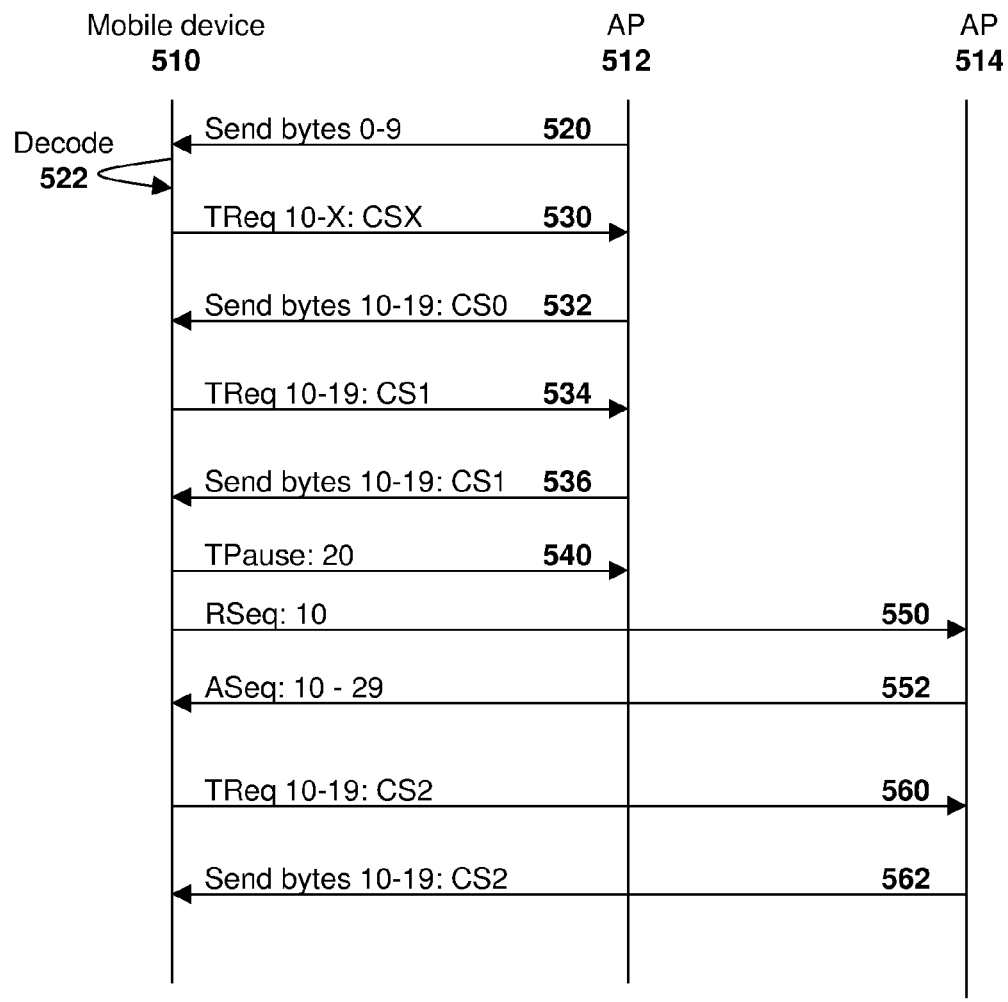
FIG. 5 is a data flow diagram showing interaction between a mobile device and a first and second access point.

Reference is now made to FIG. 5, which shows a data flow diagram between a first mobile device 510, a first access point 512 and a second access point 514.

As seen in message 520 the mobile device receives byte sequence numbers 0 to 9 from access point 512 and is able to decode these successfully, as shown by arrow 522.

Mobile device 510 then sends a transmission request (Treq) to access point 512 requesting bytes 10 to X, where X designates an unspecified range. It further requests that the segment of coded bits is "CSX" indicating that all coded sequence are required.

In response to the transmission request at arrow 530 a response at arrow 532 is provided to mobile device 510. In the response at arrow 532 bytes 10 to 19 are provided with the segment of coded bits designated as "CS0".

In one example, the mobile device is unable to successfully decode the transmission due, for example, to transmission errors. Subsequently, a message transmission request is sent by the mobile device 510 to the access point 512 requesting the next segment of coded bits "CS1", shown by arrow 534 and a response, shown by arrow 536 is provided in which bytes 10 to 19 with coded sequence 1 is provided to mobile device 510.

The communication between the mobile device 510 and access point 512 may be degrading and thus the mobile device sends a transmission pause (TPause) request, shown by arrow 540. As shown by arrow 540, the TPause request may indicate the number of frames or a time unit for the pause.

If it has not already done so, mobile device 10 may then send a registration message 550 to access point 514. The registration message 550 may include the sequence number of the first byte that it wants to receive from access point 514.

Responsive to the message at arrow 550 the access point 514 provides an indication indicating that bytes 10 to 29 are available. This is shown by arrow 552.

The mobile device then requests bytes 10 to 19 with coded sequence 2 ("CS2") from access point 514, shown by arrow 560.

The bytes 10 to 19 with coded sequence 2 are provided, as shown by arrow 562. The mobile device may then be capable of combining the coded sequence 0, coded sequence 1, and coded sequence 2, as received in messages 534, 536 and 562, from the two access points as described below and successfully receive the bytes in question.

As will be appreciated by those in the art having regard to the present disclosure, if the mobile device has previously registered with access point 514 then the message shown by arrow 550 may be unnecessary and the process may move directly to the request 560 for byte sequence 10 to 19 with the segment of coded bits CS2.

In other embodiments, instead of sending a request message for particular bytes and coded sequence, a single bit "next" flag may be sent to an access point with which the mobile device has been interacting and receiving data from. For example, if the bit is set to 1, the access point is requested to transmit the next segment of the coded bits of the previously transmitted bytes sequence. Conversely, if the bit is not set, the access point is requested to proceed to transmit the first coded sequence of the next sequence of bytes available.

The above therefore provides a mechanism for signaling between a mobile device and a plurality of access points in order to receive data from the access points based on radio link conditions and the needs of the mobile device.

Soft Combining Mechanisms

Once a mobile device has received a plurality of coded sequences, the mobile device may use soft combining techniques in order to reconstruct the received message. Thus, utilizing the mechanisms described above, the mobile device is able to receive different coded sequences of the same sequence of bytes from different access points in order to improve the performance or reception in a dynamic radio environment. The manner in which the segments of coded bits, derived from the same byte sequence, and received from multiple access points, can be soft combined efficiently is described below.

In one embodiment, the sequence of bytes inputted to the radio layer and transmitted needs to be same from each access point. This is ensured by using the transmit request message which specifies the byte sequence. If different radio access technologies are used in different access points, or if there are differences in the encoding structure between access points, the segments of coded bits can be still be combined using a variety of methods.

In the disclosure below, three embodiments are provided for combining the segments of coded bits from different access points. A first involves soft combining of information prior to a decoder. A second involves soft combining of systematic bits prior to decoding. A third embodiment provides for a variant for combining soft information of a code block or the transport block after decoding.

As will be appreciated by those in the art, combining of coded bit segments from different access points does not require the streams to be received at the same time. Also, coded bit segments from multiple access points received at any time, and in any combination of transmission sizes from each of one or more sources, can be combined according to the various embodiments described below.

Figure 6:
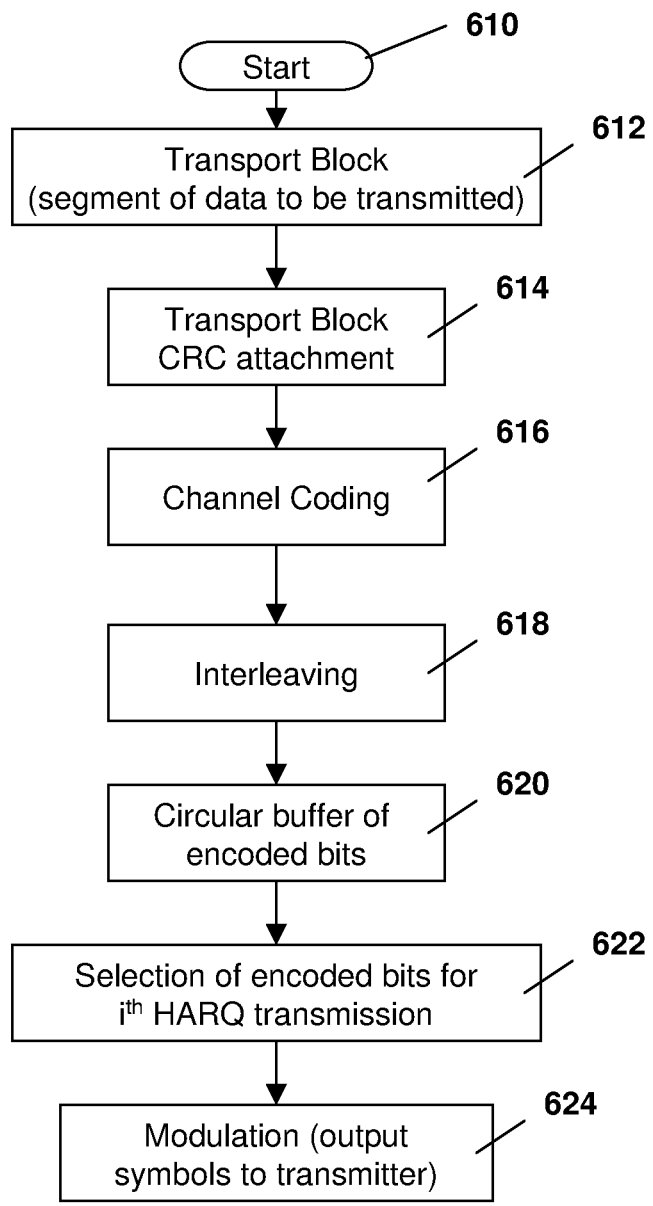
FIG. 6 is a process diagram showing the encoding of data at an access network.

Reference is now made to FIG. 6. FIG. 6 shows a process diagram for physical layer segmentation and coding of a downlink byte stream at an access point. As will be appreciated by those in the art, the process of FIG. 6 is merely an example and other segmentation and coding schemes are possible at access points.

The process of FIG. 6 starts at block 610 and proceeds to block 612 in which a transport block is generated. According to one aspect of the present disclosure, the sequence of data bytes is selected by the mobile device from the total packet stream destined for the mobile device. This is a segment of data that is to be transmitted to the mobile device.

The process then proceeds to block 614 in which the transport block cyclic redundancy check (CRC) is calculated and added to the transfer block.

The process then proceeds to block 616 in which the transport block with CRC attachment is channel coded. The channel encoder is used to form a series encoded bits that are used for forward error correction. This set of coded bits includes systematic bits, which are the same as the uncoded bits of the transport block plus the CRC, and parity bits which are the other coded bits produced by the encoder.

The process then proceeds to block 618 in which interleaving occurs. The encoded bits may be interleaved (or scrambled) in a reversible manner to be recoverable at the receiver.

At block 620 a circular buffer of encoded bits is created and the process then proceeds to block 622 in which the encoded bits for the $i^{th}$ HARQ transmission are selected. The set of coded bits forms a virtual circular HARQ buffer at the access point. From the circular buffer, segments of coded bits are selected for each transmission based on instructions received from the mobile device. According to another aspect of the present disclosure, the segment of coded bits to be transmitted are selected by the mobile device using the transmission request. Thus these segments of coded bits are used by the access point as the physical layer packet data unit (PDU).

The selection of coded bits in the physical layer PDU is then modulated at block 624 and the access point then is ready to send the data to the mobile device.

Figure 7:
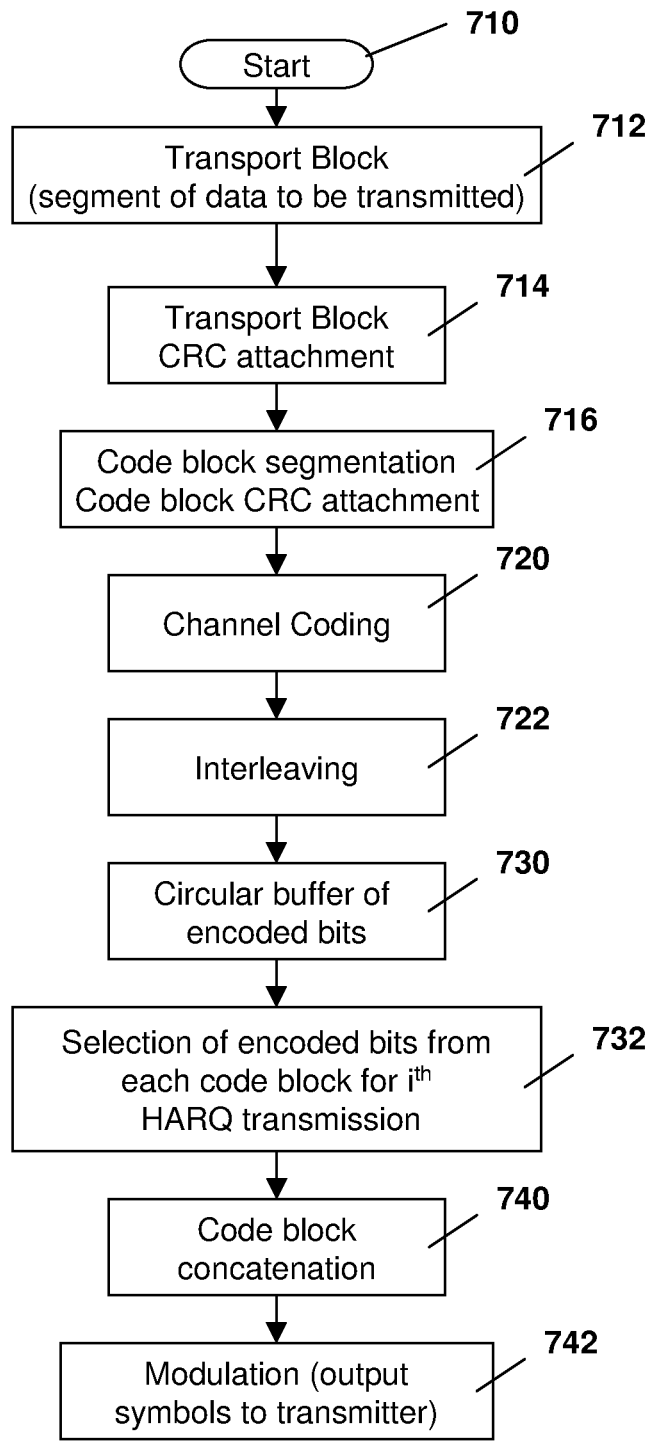
FIG. 7 is a process diagram showing the encoding and code block segmentation of data at an access network

In some cases, the transport block is further divided before encoding to reduce the turbo encoding and decoding complexity. The transport block is segmented into code blocks according to some rule. In some cases, this segmentation may be a property of the transmitter or radio access technology. In other cases, the transport block segmentation may be negotiated by the mobile device during registration with the access network. If the transport block segmentation is negotiated, each virtual circular buffer contains coded bits for one code block. When the mobile device requests a certain segment of coded bits, the access point selects the appropriate bits from each code block, interleaves and concatenates them to form a physical layer PDU. Reference is now made to FIG. 7.

The process of FIG. 7 starts a block 710 and proceeds to block 712 in which a transport block is provided.

From block 712 the process proceeds to block 714 in which a transport block CRC is calculated and attached to the transport block.

The process then proceeds to block 716 to segment the transport block into a set of code blocks and to calculate and add a code block CRC to each code block.

From block 716 the process proceeds to block 720 in which the code block segment with the code block CRC attachment is channel coded. The process then proceeds to block 722 in which the channel coded segment may be interleaved or scrambled.

The process then proceeds to block 730 in which the interleaved block forms a circular buffer of encoded bits.

The process then proceeds to block 732 in which the encoded bits from each code block for the $i^{th}$ HARQ transmission is selected. As will be appreciated, this is done based on instructions received from the mobile device through, for example, the transmit request message.

The process then proceeds to block 740 in which code block concatenation into a physical layer PDU occurs. The process then proceeds to block 742 in which the physical layer PDU is modulated for output to transmitter.

Generally, the case of segmenting the transport block into code blocks and the concatenation of bits from multiple code blocks into a physical layer PDU is provided. It will be appreciated by those in the art having regard to the above that the trivial case where there is only one code block, and where the code block CRC is not applied, is included in the present disclosure.

The bits of the physical layer PDU may further be interleaved or punctured and then mapped to a modulation scheme such as quadrature phase shift keying (QPSK), 16 QAM (quadrature amplitude modulation), among others.

The further interleaving or puncturing or the modulation can be access point or radio access technology specific and do not need to be the same for data streams to be soft combined based on any of the combining methods as described below, as long as the process can be reversed at the receiver.

At a mobile device receiver, the actions of modulation and interleaving are reversed. The code block encoded bits are separated and each code block is decoded and verified by the code block CRC. If all code blocks are received successfully, the code blocks are aggregated into the transport block and this is verified by the transport block CRC.

If the transport block CRC fails, or if any code block CRC fails, the mobile device sends a request to the access point or access points for additional coded bits and the HARQ process continues with additional transmissions from the access point or access points. If the maximum number of HARQ retransmissions have occurred, reception of the transport block is deemed to have failed and an indication is then passed to higher network layers within the mobile device for possible recovery of these errors at those layers.

Figure 8:
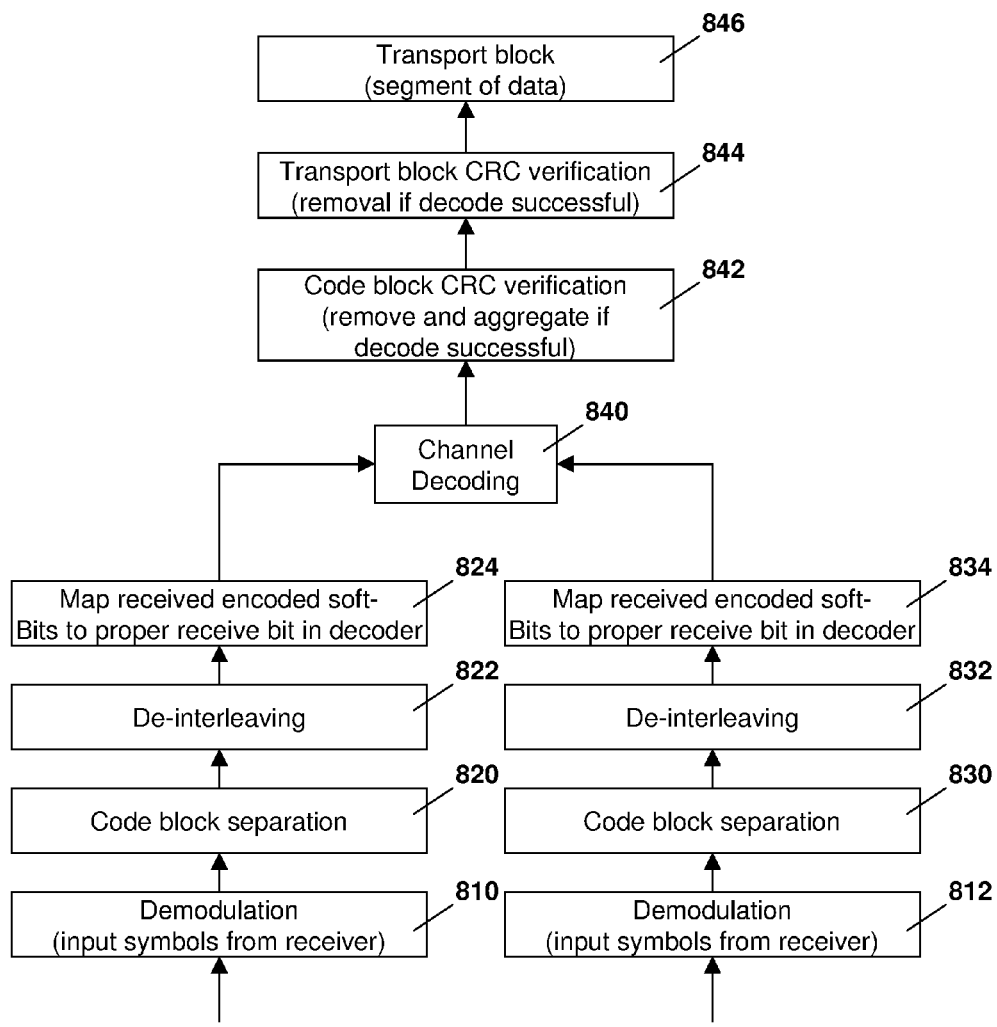
FIG. 8 is a process diagram showing the soft combining of data prior to decoding.

Various embodiments of receivers are possible. Reference is now made to FIG. 8.

In the embodiment of FIG. 8, segments of coded bits received from one or more access points are inputted to the decoder and are soft combined. In order to allow soft combining at this level, the transmitter processes up to and including the output of the encoder, which includes transport block segmentation, if present, must be the same in all of the contributing access points. This is achieved by using the registration message to configure the access networks with appropriate parameters. If the segments of the transfer block, CRC attachment and encoding are the same at multiple access points, the set of encoded bits will also be the same, and any HARQ transmission will be a subset of those bits. The bits selected for each HARQ transmission from the circular buffer for each access point can be different, so long as the mobile device is aware of which bits are being transmitted so it can properly map them to the correct decoder inputs. As will be appreciated by those in the art having regard to the present disclosure, the transmission request message allows this coordination.

As illustrated in FIG. 8, the received signal from each contributing access point is first demodulated. Thus, a first access point may have a demodulation block 810 while a second access point may have a second demodulation block 812.

After demodulation block 810, a code block separation block 820 is provided. The code block separation block 820 separates the individual code blocks from the concatenated physical layer PDU.

The signal is then provided to de-interleaving block 822, which removes the interleaving performed at the access point.

The de-interleaved signal is then provided to block 824, which maps the receiving coded soft bits to the proper received bit in the decoder.

Similarly, the output from demodulation block 812 is provided to code separation block 830, de-interleaving block 832 and a mapping block 834.

The output from mapping blocks 824 and 834 are provided to channel decoding block 840. Thus, the de-interleaved soft values of each bit after demodulation, for example log-likelihood ratios after a maximum a priori (MAP) demodulation, are combined with the soft values of that bit received from other access points that correspond to the same encoded bit. These values are inputted to the decoder. This process is similar to receiving multiple transmissions from a single AP in an HARQ system with incremental redundancy. In this case, however, the replicas are arriving from different access points and the bits transmitted are specified by the mobile device according to the embodiments described above.

After soft combining and channel decoding at block 840, the CRC for each code block is verified at block 842. The verified code blocks are used to reconstruct the transport block which is then CRC verified at block 844.

The output if the transport block CRC is successful is the transfer block with the segment of data, as shown as block 846.

In an alternative embodiment, the configuration of some access points from which the mobile device receives transmissions may be different. In particular, the encoder structure may be different such that the encoded bits from different access points cannot be decoded with the same decoder. This may occur, for example, in the embodiments described above if, during registration, the mobile device is only granted partial configuration of the encoder by some access networks. In such cases, segments of coded bits received from incompatible access points are processed at the mobile device decoder in separate received streams. The mobile device may employ a method of soft combining of only the systematic bits prior to the encoder, since the systematic bits are simply the uncoded code block bits, these bits will be the same at the receiver, regardless of the different encoder structure and may be soft combined.

Figure 9:
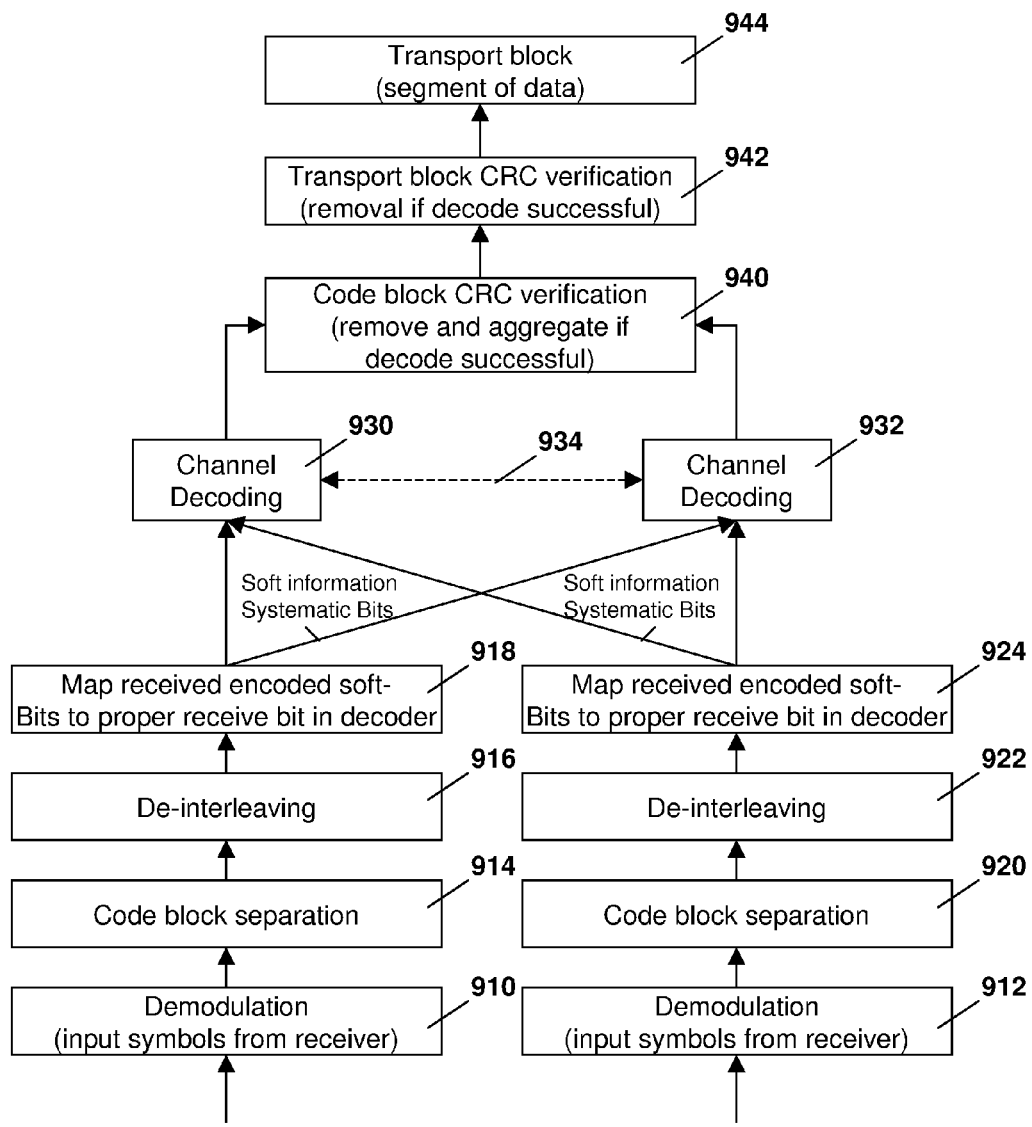
FIG. 9 is a process diagram showing the soft combining of data encoded with different schemes in which systematic bits are used for channel decoding.

Reference is now made to FIG. 9. In FIG. 9 the signals received from each access point are first demodulated at blocks 910 and 912.

The demodulated signal from block 910 is then code block separated at block 914, de-interleaved at block 916 and the received encoded soft bits are mapped to the proper received bits in the decoder at block 918.

Similarly, the output from demodulation block 912 is code block separated at block 920, de-interleaved at block 922, and the encoded soft bits are mapped to the proper received bits in the decoder at block 924.

In the embodiment of FIG. 9, two channel decoding blocks are provided, namely blocks 930 and 932.

The output from mapping block 918 is provided to block 930. In other words, all received bits from mapping block 918 are provided to channel decoding block 930. Similarly, the output from mapping block 924 is provided to channel decoding block 932. Thus, all received bits from mapping block 924 are provided to channel decoding block 932.

In addition, block 918 provides the soft values of its systematic bits to channel decoding block 932 prior to decoding. Similarly, mapping block 924 provides the soft values of its systematic bits to channel decoding block 930 prior to decoding. As will be appreciated by those in the art having regard to the present disclosure, if the transport block segmentation is the same for each access point, then the systematic bits for each code block will be the same and they can be directly combined. If the segmentation of the transport block is different across the received streams, then the co-blocks are different for the different received streams and the systematic bits from the code blocks of the received stream will need to be appropriately mapped to the correct element at the input to the decoder.

The providing of systematic bits from the segments of the coded bits for each received stream provides for improved decoding performance.

In one embodiment, if the decoders are compatible, that is both derivative decoders use the same systematic bits, joint decoding may be possible. Thus, in some implementation, joint decoding can be implemented across the different decoders, as shown by dotted line 934. In this case, after each iteration of the decoding process in each stream, the systematic bits of the common code blocks are passed between decoders, soft combined with the information of the other decoder before continuing to the next iteration.

After decoding, the output from channel decoder 930 and channel decoder 932 is provided to code block CRC verification block 940, which provides CRC verification of the code block. If successful the output from code block CRC verification block 940 is provided to transport block CRC verification block 942, which verifies the transport block CRC. If successful, the transport block with the segmented data is provided to the device as shown by block 944.

If the segments of encoded bits from different access points cannot be decoded with a single decoder, or otherwise are incompatible for combining in their encoding or segmentation, it may be undesirable to combine at or before decoding since they may include different encoding or segmentation. However, the mobile device can still accomplish the same soft combining as described above with reference to FIGS. 8 and 9. Three options are provided for such combining after decoding.

Figure 10:
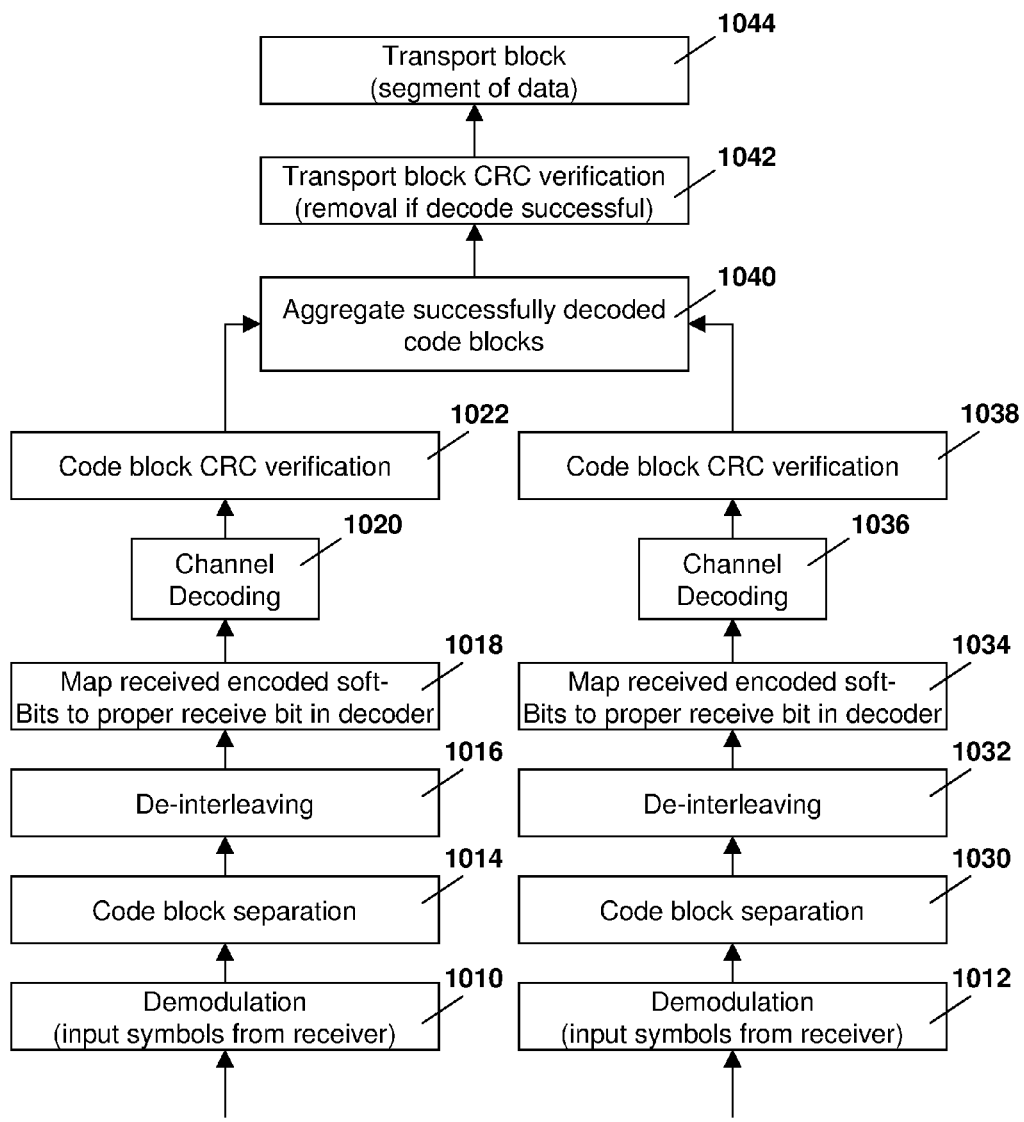
FIG. 10 is a process diagram showing aggregation of two streams after channel decoding.

In a first embodiment for combining after decoding, reference is now made to FIG. 10. In FIG. 10 the signals from the different access points are demodulated at blocks 1010 and 1012.

After demodulation at block 1010 the bits are code block separated at block 1014. The bits are then de-interleaved at block 1016, the encoded soft bits are mapped to the proper received bits in the decoder at block 1018 and channel decoding is performed at block 1020. Output from channel decoding block 1020 is code block CRC verified at block 1022.

Similarly, signals from the second access point are demodulated at block 1012 and are code block separated at block 1030. The bits are then de-interleaved at block 1032 and the encoded soft bits are mapped to the proper received bits in the decoder at block 1034.

After the mapping of block 1034, the bits are channel decoded at block 1036 and a code block CRC verification is performed at block 1038.

An aggregation block 1040 aggregates successfully decoded code blocks from blocks 1022 and 1038. Thus, in the embodiment of FIG. 10, the successfully decoded code blocks from the different received streams are aggregated in order to successfully retrieve the sent transfer block. Since the signals received are passed through separate decoders, which may be part of different radio access technologies or radio layers, each access point can have separate technology.

In code block decoding, each code block is verified by the code block CRC. These successfully decoded code blocks from blocks 1022 and 1038 are aggregated at block 1040 to try to form the transport block. Successful reception of all code blocks that constitute a transport block is indicated by successful verification of the transport block CRC at block 1042 and the transport block is thus generated at block 1044.

If not all code blocks have been successfully received or if the transport block CRC fails, the HARQ procedure proceeds as described above.

Figure 11:
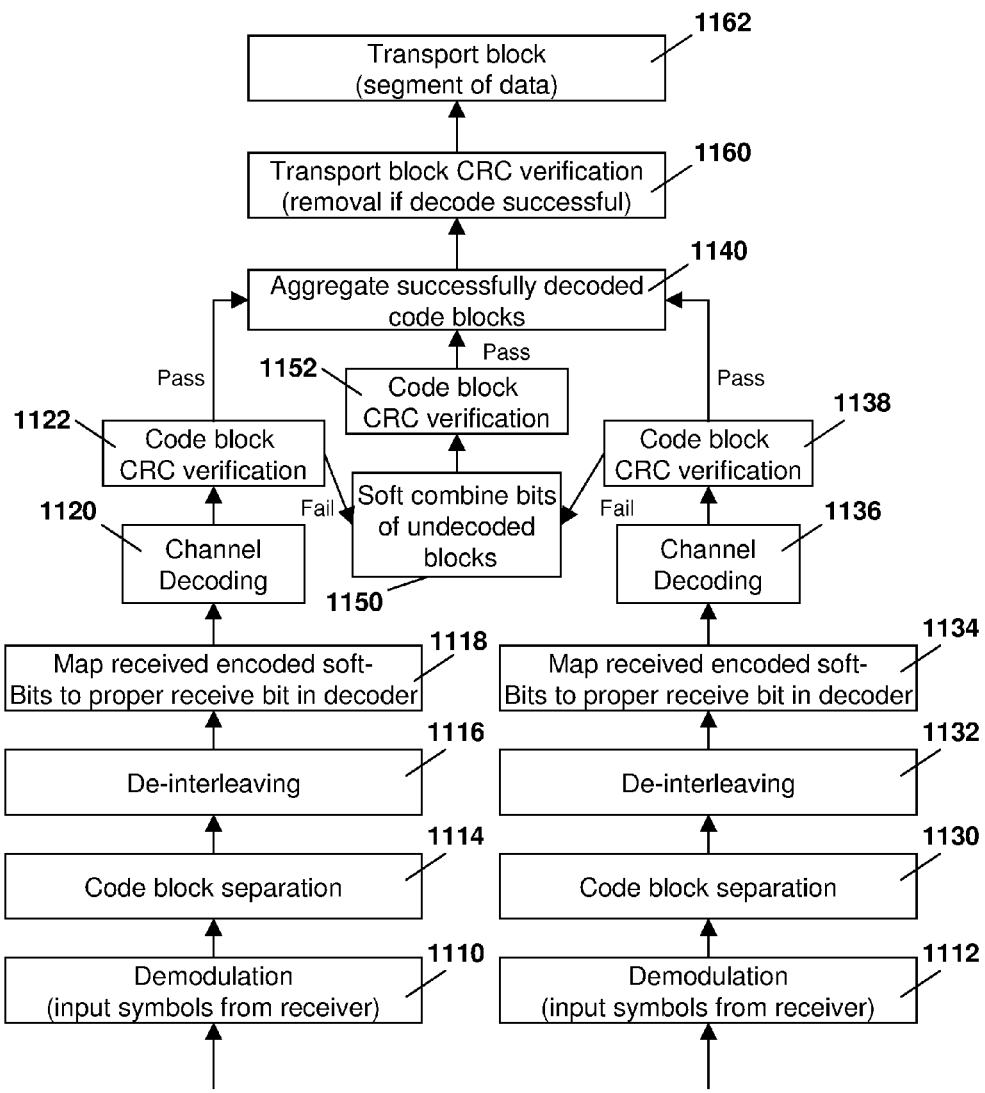
FIG. 11 is a process diagram showing aggregation of two streams after channel decoding along with soft combining of undecoded streams.

In a second variant for combining after decoding, reference is now made to FIG. 11. In the embodiment of FIG. 11, soft information of code blocks are soft combined from the output of the decoder streams only after unsuccessful decoding in an attempt to successfully retrieve the sent code block.

Referring to FIG. 11, the signals from different access points are demodulated at blocks 1110 and 1112 respectively.

The output from demodulation block 1110 is provided to a code separation block 1114, de-interleaved at block 1116 and the encoded soft bits are mapped to the proper received bits in the decoder at block 1118.

The output from mapping block 1118 is provided to a channel decoding block 1120, which is then provided to a code block CRC verification block 1122.

Similarly, the output from demodulation block 1112 is provided to a code block separation block 1130, a de-interleaving block 1132, mapping block 1134 in which the encoded soft bits are mapped to the proper received bit in the decoder, channel decoding block 1136 and a code block CRC verification block 1138.

As illustrated in FIG. 11, the code blocks from different received streams are passed through the different decoders which may form part of different radio access technologies or radio layers. The systematic bits of a given code block are, however, the same cross radio access technologies.

During code block decoding, each code block is verified by the code block CRC 1122 and 1138.

Successfully decoded code blocks based on the CRC verification of either block 1122 or block 1138 are aggregated at aggregation block 1140.

However, the embodiment of FIG. 11 differs from the embodiment of FIG. 10 in that if the code block CRC verification from both streams fails then soft information from the unsuccessfully decoded blocks are combined if possible in order to successfully retrieve the information. For example, the extrinsic information used to make the hard decision at the output of each decoder can be combined with extrinsic information for the same bits from other decoders. In some cases, the diversity of the two received streams and combining the extrinsic information will result in successful CRC verification of one or more code blocks in the contributing received streams. In some embodiments, additional decoding attempts such as turbo decoding iterations may occur after soft combining of information to CRC verification.

Referring again to FIG. 11, if the code block CRC verification fails at both blocks 1122 and 1138, the failed code blocks are passed to block 1150 which provides for soft combining of the bits of the undecoded blocks. The soft combined bits are then passed to block 1152 where a code block CRC verification occurs. If the code block CRC verification passes the code block is passed to aggregation block 1140 to be aggregated.

After aggregation, a transport block CRC verification occurs at block 1160. When CRC verification for the transport block passes, the transport block is formed, as shown by block 1162.

Figure 12:
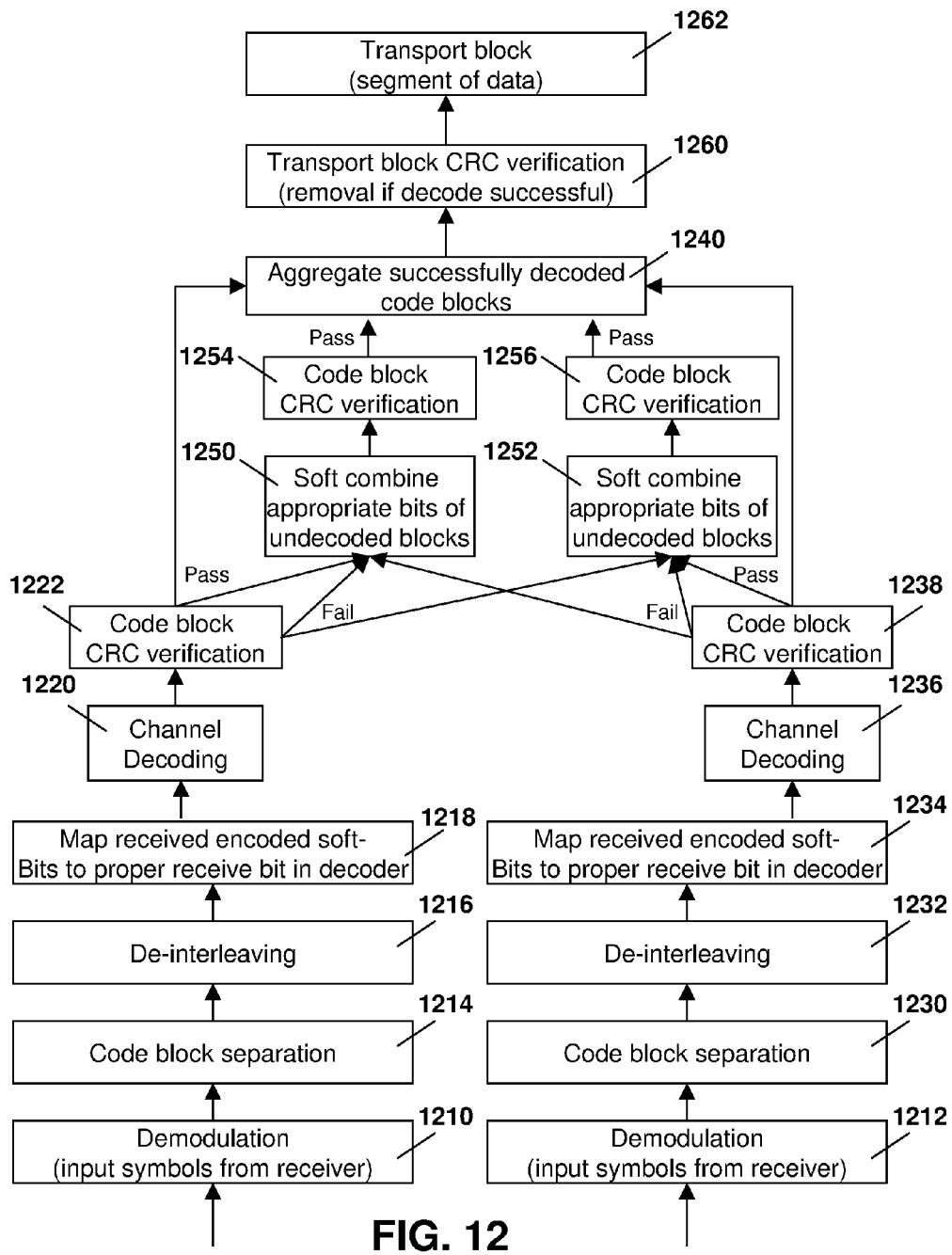
FIG. 12 is a process diagram showing aggregation of two streams after channel decoding along with soft combining of decoded and undecoded bits from the two streams.

In a third embodiment of combining data stream information after decoding, reference is now made to FIG. 12. Similar to FIGS. 10 and 11, demodulation occurs at blocks 1210 and 1212 for the different access points. After demodulation at block 1210, code block separation occurs at block 1214, de-interleaving occurs at block 1216, the encoded soft bits are mapped to the proper received bits in the decoder at block 1218 and the channel decoding occurs at block 1220. The decoded signal is then code block CRC verified at block 1222.

Similarly, after demodulation at block 1212 the code block separation occurs at block 1230, de-interleaving occurs at block 1232, the received encoded soft bits are mapped to the proper received bits in the decoder at block 1234, the mapped block output is then channel decoded at block 1236 and code block CRC verification occurs at block 1238.

If the code block CRC verification passes at either block 1222 or block 1238, then code blocks are aggregated at block 1240.

If the union of bits from all CRC verified code blocks from all received streams cannot be used to reconstitute the bits of the entire transport block in its CRC, the soft information from the unsuccessful and successfully decoded code blocks from the different received streams are combined where possible to attempt to successfully retrieve the information. Successfully decoded code blocks are also used in the embodiment of FIG. 12 as correctly decoded bits from a portion of one code block may be used to improve decoding of a code block from another received stream with possible different code block segmentations. However, as the transport block has been segmented differently in each stream, the appropriate bits from each code block must be aligned and combined.

Further, after soft combining the individual bits must be inserted back into the code blocks of each received stream and the CRC verification checked for the respective code blocks to determine if an error free code block has been reconstituted. In some embodiments, additional decoding attempts such as turbo decoding durations may occur after soft combining of the information to the CRC verification.

Specifically, the successful code block decoding from block 1222 is provided to soft combining block 1250. Unsuccessful code block CRC verifications from block 1222 are provided to soft combining blocks 1250 and 1252.

Similarly, successful CRC verifications from block 1238 are provided to soft combining block 1252 and unsuccessful CRC verifications from block 1238 are provided to soft combining blocks 1250 and 1252.

The output from soft combining block 1250 is CRC verified at block 1254 and if successful the output is passed to aggregation block 1240.

Similarly, the output from soft combining block 1252 is CRC verified at block 1256 and if successful the out is passed to aggregation block 1240.

After the code blocks have been aggregated at block 1240, the output is passed to block 1260 in which the transport block CRC verification occurs. If the transport block CRC verification is successful then the transport block is composed at block 1262.

Thus, the embodiment of FIG. 12 is an expanded version of the embodiment of FIG. 11 with the additional procedure of soft combining across differently segmented code blocks from the same transport block in the aggregation of bits across received streams when not all code blocks at the transport block are successfully decoded.

The above therefore provides for the receipt of data from multiple access points and the ability of the mobile device to request certain data from the desired access points.

Further, the above provides for the combining of data streams from different access points.

The above embodiments could be implemented on any mobile device. One exemplary mobile device is provided below with regard to FIG. 13. However, this is merely meant as an example and other mobile devices could be utilized in accordance with the present systems and methods.

Mobile device 1300 is typically a two-way wireless communication device having voice and data communication capabilities. Mobile device 1300 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment, or a data communication device, as examples.

Where Mobile device 1300 is enabled for two-way communication, it will incorporate a communication subsystem 1311, including both a receiver 1312 and a transmitter 1314, as well as associated components such as one or more antenna elements 1316 and 1318, local oscillators (LOs) 1313, and a processing module such as a digital signal processor (DSP) 1320. As will be apparent to those skilled in the field of communications, the particular design of the communication subsystem 1311 will be dependent upon the communication network in which the device is intended to operate. The mobile device 1300 may be capable of accessing multiple radio access technologies in accordance with the embodiments described above.

Network access requirements will also vary depending upon the type of network 1319. In some networks network access is associated with a subscriber or user of mobile device 1300. A mobile device may require a removable user identity module (RUIM) or a subscriber identity module (SIM) card in order to operate on a CDMA network. The SIM/RUIM interface 1344 is normally similar to a card-slot into which a SIM/RUIM card can be inserted and ejected. The SIM/RUIM card can have memory and hold many key configurations 1351, and other information 1353 such as identification, and subscriber related information.

Figure 13:
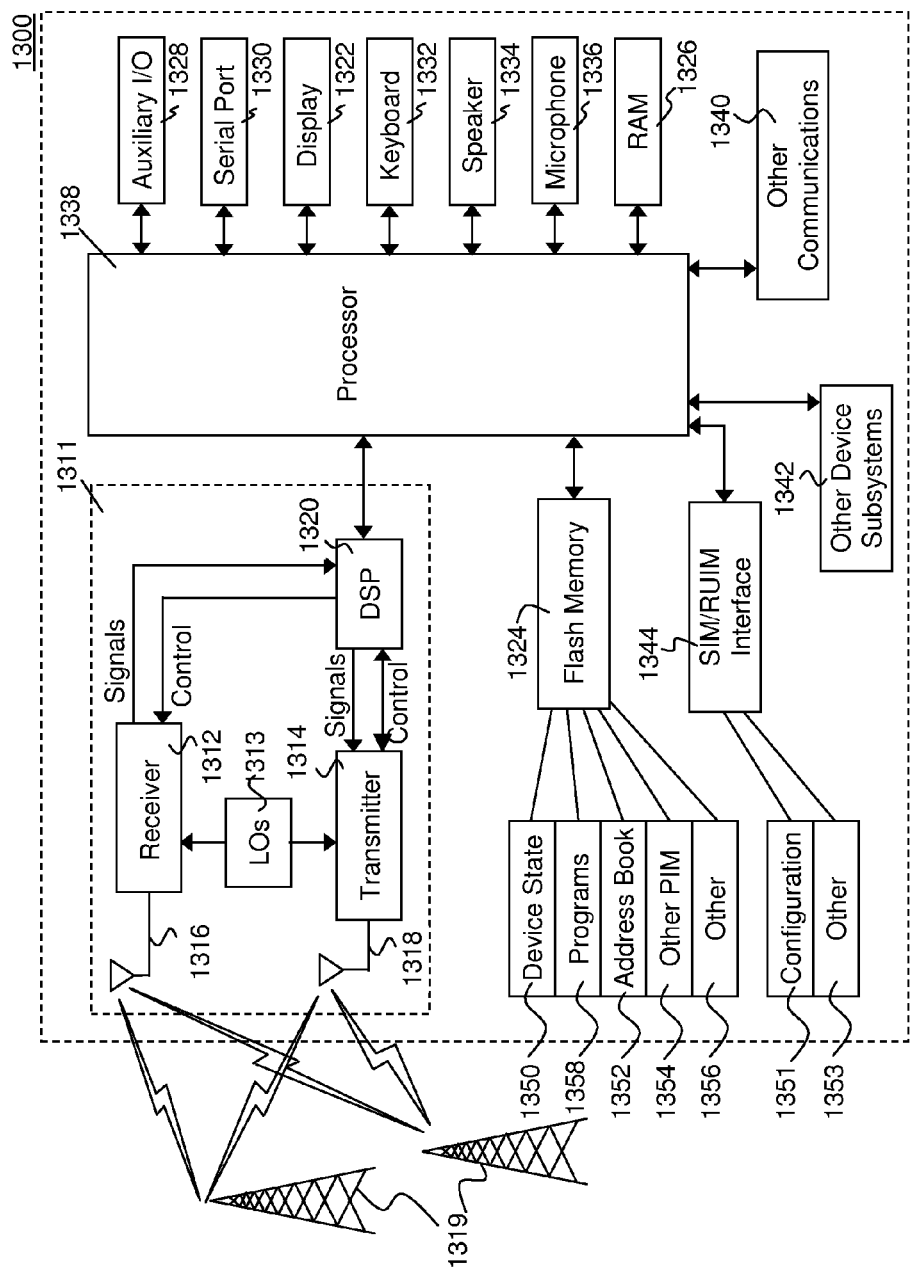
FIG. 13 is a block diagram of an exemplary mobile device capable of being used with the present device.

When required network registration or activation procedures have been completed, mobile device 1300 may send and receive communication signals over the network 1319. As illustrated in FIG. 13, network 1319 can consist of multiple base stations communicating with the mobile device. For example, in a hybrid CDMA 1× EVDO system, a CDMA base station and an EVDO base station communicate with the mobile station and the mobile device is connected to both simultaneously. Other examples of network technologies and base stations would be apparent to those in the art.

Signals received by antenna 1316 through communication network 1319 are input to receiver 1312, which may perform such common receiver functions as signal amplification, frequency down conversion, filtering, channel selection and the like. A/D conversion of a received signal allows more complex communication functions such as demodulation and decoding to be performed in the DSP 1320. In a similar manner, signals to be transmitted are processed, including modulation and encoding for example, by DSP 1320 and input to transmitter 1314 for digital to analog conversion, frequency up conversion, filtering, amplification and transmission over the communication network 1319 via antenna 1318. DSP 1320 not only processes communication signals, but also provides for receiver and transmitter control. For example, the gains applied to communication signals in receiver 1312 and transmitter 1314 may be adaptively controlled through automatic gain control algorithms implemented in DSP 1320.

Mobile device 1300 generally includes a processor 1338 which controls the overall operation of the device. Communication functions, including data and voice communications, are performed through communication subsystem 1311. Processor 1338 also interacts with further device subsystems such as the display 1322, flash memory 1324, random access memory (RAM) 1326, auxiliary input/output (I/O) subsystems 1328, serial port 1330, one or more keyboards or keypads 1332, speaker 1334, microphone 1336, other communication subsystem 1340 such as a short-range communications subsystem and any other device subsystems generally designated as 1342. Serial port 1330 could include a USB port or other port known to those in the art.

Some of the subsystems shown in FIG. 13 perform communication-related functions, whereas other subsystems may provide "resident" or on-device functions. Notably, some subsystems, such as keyboard 1332 and display 1322, for example, may be used for both communication-related functions, such as entering a text message for transmission over a communication network, and device-resident functions such as a calculator or task list.

Operating system software used by the processor 1338 may be stored in a persistent store such as flash memory 1324, which may instead be a read-only memory (ROM) or similar storage element (not shown). Those skilled in the art will appreciate that the operating system, specific device applications, or parts thereof, may be temporarily loaded into a volatile memory such as RAM 1326. Received communication signals may also be stored in RAM 1326.

As shown, flash memory 1324 can be segregated into different areas for both computer programs 1358 and program data storage 1350, 1352, 1354 and 1356. These different storage types indicate that each program can allocate a portion of flash memory 1324 for their own data storage requirements. Processor 1338, in addition to its operating system functions, may enable execution of software applications on the mobile device. A predetermined set of applications that control basic operations, including at least data and voice communication applications for example, will normally be installed on mobile device 1300 during manufacturing. Other applications could be installed subsequently or dynamically.

Applications and software may be stored on any computer readable storage medium. The computer readable storage medium may be a tangible or intransitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application may have the ability to send and receive data items, via the wireless network 1319. In one embodiment, the PIM data items are seamlessly integrated, synchronized and updated, via the wireless network 1319, with the mobile device user's corresponding data items stored or associated with a host computer system. Further applications may also be loaded onto the mobile device 1300 through the network 1319, an auxiliary I/O subsystem 1328, serial port 1330, short-range communications subsystem 1340 or any other suitable subsystem 1342, and installed by a user in the RAM 1326 or a non-volatile store (not shown) for execution by the processor 1338. Such flexibility in application installation increases the functionality of the device and may provide enhanced on-device functions, communication-related functions, or both. For example, secure communication applications may enable electronic commerce functions and other such financial transactions to be performed using the mobile device 1300.

In a data communication mode, a received signal such as a text message or web page download will be processed by the communication subsystem 1311 and input to the processor 1338, which may further process the received signal for output to the display 1322, or alternatively to an auxiliary I/O device 1328.

A user of mobile device 1300 may also compose data items such as email messages for example, using the keyboard 1332, which may be a complete alphanumeric keyboard or telephone-type keypad, among others, in conjunction with the display 1322 and possibly an auxiliary I/O device 1328. Such composed items may then be transmitted over a communication network through the communication subsystem 1311.

For voice communications, overall operation of mobile device 1300 is similar, except that received signals would typically be output to a speaker 1334 and signals for transmission would be generated by a microphone 1336. Alternative voice or audio I/O subsystems, such as a voice message recording subsystem, may also be implemented on mobile device 1300. Although voice or audio signal output is preferably accomplished primarily through the speaker 1334, display 1322 may also be used to provide an indication of the identity of a calling party, the duration of a voice call, or other voice call related information for example.

Serial port 1330 in FIG. 13 would normally be implemented in a personal digital assistant (PDA)-type mobile device for which synchronization with a user's desktop computer (not shown) may be desirable, but is an optional device component. Such a port 1330 would enable a user to set preferences through an external device or software application and would extend the capabilities of mobile device 1300 by providing for information or software downloads to mobile device 1300 other than through a wireless communication network. The alternate download path may for example be used to load an encryption key onto the device through a direct and thus reliable and trusted connection to thereby enable secure device communication. As will be appreciated by those skilled in the art, serial port 1330 can further be used to connect the mobile device to a computer to act as a modem.

Other communications subsystems 1340, such as a short-range communications subsystem, is a further optional component which may provide for communication between mobile device 1300 and different systems or devices, which need not necessarily be similar devices. For example, the subsystem 1340 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a receiving device, comprising:
   establishing by the receiving device a receive time period to receive an indication of pending data from an access network;
   negotiating the established receive time period with the access network;
   receiving during the negotiated receive time period an indication of pending data from the access network, the pending data including a sequence number for every unit of the pending data;
   sending transmission instructions to a first transmitter at a first access point within the access network, the transmission instructions including a range of sequence numbers corresponding to sequence numbers of respective units of the pending data desired by the receiving device, and an error correction and coding scheme to be used by the first transmitter, the sequence numbers corresponding to previously unsuccessfully decoded data unit received from a second transmitter at a second access point different to said first access point; and
   combining received units of the pending data in the range of sequence numbers from the first transmitter with received units of the pending data in the same range of sequence numbers received from the second transmitter;
   wherein the transmission instructions specifies a segment of coded bits for the range of sequence numbers for the units of the pending data desired by the receiving device.

2. The method of claim 1, wherein the transmission instructions provide the receive time period to receive the pending data transmitted from the first transmitter.

3. The method of claim 1, wherein the transmission instructions start negotiations between the receiving device and first transmitter for an error correction and coding scheme for downlink data.

4. The method of claim 1, further comprising providing second transmission instructions to the second transmitter.

5. The method of claim 4, wherein the second transmission instructions specifies a segment of coded bits for the range of sequence numbers for the units of the pending data desired by the receiving device.

6. The method of claim 5, further comprising soft combining a first transmission received from the first transmitter with a second transmission received from the second transmitter prior to a single channel decoder if the first transmitter and second transmitter use the same encoder.

7. The method of claim 5, wherein, if the first transmitter and second transmitter use different encoders, the method further comprising soft combining a first stream received from the first transmitter with a second stream received from the second transmitter by utilizing systematic bits from the first stream or second stream at a decoder for the other of the first stream and second stream.

8. The method of claim 5, wherein, if the first transmitter and second transmitter use different encoders, the method further comprising soft combining a first stream received from the first transmitter with a second stream received from the second transmitter by passing information from one of the first stream or second stream to a decoder for the other of the first stream and second stream after each decoding iteration.

9. The method of claim 5, wherein, if the first transmitter and second transmitter use different encoders, the method further aggregating a first stream received from the first transmitter with a second stream received from the second transmitter after channel decoding.

10. The method of claim 9, further comprising soft combining bits of undecoded blocks of the first stream with bits of undecoded blocks of the second stream.

11. The method of claim 9, further comprising soft combining bits of undecoded blocks of the first stream with bits of undecoded blocks and decoded blocks of the second stream.

12. A receiving device comprising:
   a processor; and
   a communications subsystem,
   wherein the receiving device is configured to:
   establish by the receiving device a receive time period to receive an indication of pending data from an access network;
   negotiate the established receive time period with the access network;
   receive during the negotiated receive time period an indication of pending data from the access network, the pending data including a sequence number for every unit of the pending data;
   send transmission instructions to a first transmitter at a first access point within the access network, the transmission instructions including a range of sequence numbers corresponding to sequence numbers of respective units of the pending data desired by the receiving device, and an error correction and coding scheme to be used by the first transmitter, the sequence numbers corresponding to previously unsuccessfully decoded data unit received from a second transmitter at second access point different to said first access point; and combining received units of the pending data in the range of sequence numbers from the first transmitter with received units of the pending data in the same range of sequence numbers received from the second transmitter;

wherein the transmission instructions specifies a segment of coded bits for the range of sequence numbers for the units of the pending data desired by the receiving device.

* * * * *